United States Patent [19]

Turner

[11] 4,327,411

[45] Apr. 27, 1982

[54] HIGH CAPACITY ELASTIC STORE HAVING CONTINUOUSLY VARIABLE DELAY

[75] Inventor: Gary A. Turner, Newburyport, Mass.

[73] Assignee: Bell Telephone Laboratories, Incorporated, Murray Hill, N.J.

[21] Appl. No.: 127,262

[22] Filed: Mar. 4, 1980

[51] Int. Cl.³ .................. G06F 13/02; G06F 13/06
[52] U.S. Cl. .............................. 364/900; 235/92 SH
[58] Field of Search ... 364/200 MS File, 900 MS File; 371/5, 61, 62; 235/92 SH

[56] References Cited

U.S. PATENT DOCUMENTS

| | | | |
|---|---|---|---|
| 3,829,843 | 8/1974 | Cichetti et al. | 364/200 |
| 3,887,769 | 6/1975 | Cichetti et al. | 178/69.5 |
| 3,975,712 | 8/1976 | Hepworth et al. | 364/200 |
| 4,047,246 | 9/1977 | Kerllenevich | 364/200 |
| 4,071,887 | 1/1978 | Daly et al. | 364/900 |

OTHER PUBLICATIONS

Bell Lab. Publication, "Transmission Sys. for Comm.", Dec. 1971, section 26.2, pp. 616-618.

Primary Examiner—Gareth D. Shaw
Assistant Examiner—David Y. Eng
Attorney, Agent, or Firm—David R. Padnes

[57] ABSTRACT

A commutator-type data store (102) is serially connected to a variable length shift register (104). Data is first written in the commutator store at the incoming varying line rate. A predetermined time later, the stored bits are read out from the commutator-type store and stored in the shift register at a given rate. Finally, the shift register data is read out at a constant predetermined rate. The length of the shift register is controlled by a counter (110). The phase relationship between the commutator write and read cycles is monitored by logic circuitry (501, 502, 503, 504, 505, 506) within the control unit (106). If this phase relationship has increased by a preselected amount, the commutator readout rate is increased along with the length of the shift register. Alternatively, if the phase relationship has decreased by a preselected amount, the commutator store readout rate is decreased along with a decrease of the shift register length.

6 Claims, 5 Drawing Figures

HIGH CAPACITY ELASTIC STORE HAVING CONTINUOUSLY VARIABLE DELAY

TECHNICAL FIELD

The present invention relates to an elastic store for data bits and, more particularly, to a store capable of providing continuously variable delay and storing several hundred data bits.

BACKGROUND OF THE INVENTION

In data transmission systems, each terminal is provided with a local clock source for the timing of operations at that terminal. All transmission links, both terrestrial and satellite, vary in electrical length with time and, therefore, in propagation delay. This variation in propagation delay causes a change in the phase of the transmitted data bits with respect to the receiver clock. Viewed in another way, there is a transient change in the rate of the incoming data bits. An elastic store in the receiving termal compensates for this variation. The elastic store is a buffer which introduces a variable delay to the incoming data bits to synchronize the data with the clock in the receiver terminal. The elastic store receives the data at the varying incoming rate and supplies it to other receiver circuitry at the receiver clock rate.

Fixed capacity buffers with independent read/write cycles have been used in data transmission networks to compensate for propagation delay variations. Such buffers, hereinafter referred to as commutator-type stores, are described in section 26.2 of "Transmission Systems for Communications" published by Bell Telephone Laboratories, revised Fourth Edition, December 1971, pages 616, 617. While commutator-type stores can provide continuously variable delay, their implementation becomes quite costly if more than a few bits of storage capacity is needed.

Variable capacity stores, such as variable length shift registers, can store a large number of data bits economically. The delay through such stores can be adjusted by varying the number of cells used for storing data. However, as each cell provides a fixed amount of delay, a shift register store can only provide incremental delay changes that only approximate the actual delay required. Such approximation can cause errors in signal processing. Consequently, a large capacity elastic store capable of providing continuously variable delay is desirable.

SUMMARY OF THE INVENTION

In accordance with the present invention, a commutator-type store and a variable length shift register are serially connected to provide, via feedback control, continuously variable delay and large storage capacity.

Incoming data bits are first written or stored in the commutator-type store. A predetermined time later, the stored bits are read out and stored in a variable length shift register. Data bits from the shift register are read out at the receiver clock rate. The length of the shift register and, hence, the delay through the same is controlled by a counter. The phase relationship between the write and read cycles of the commutator-type store is monitored by logic circuitry to prevent spilling therefrom. If this phase relationship has increased by a preselected amount, the read out rate from the commutator-type store is increased along with the length of the shift register. Alternatively, if the phase relationship has decreased by a preselected amount, the commutator read out rate is decreased along with a decrease of the shift register length.

It is a feature of the present invention that the above-described configuration and controls are readily adaptable to applications requiring vastly different amounts of storage capacity.

It is a further feature of the present invention that frame slipping can be employed to prevent loss of framing as the shift register nears overflow or underflow.

A still further feature of the present invention is the utilization of a Random Access Memory (RAM) unit as the variable length shift register to provide economical, high capacity storage and a compact physical size.

DETAILED DESCRIPTION

Figures 1, 2:
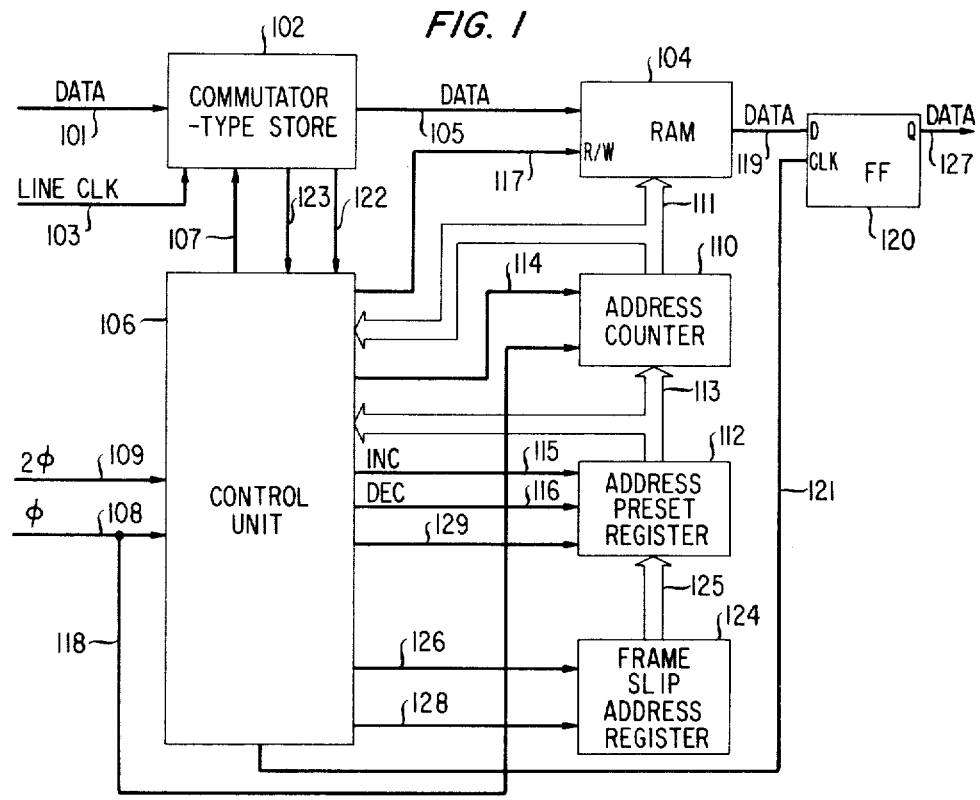
FIG. 1 illustrates a schematic block diagram of the preferred embodiment of the present invention.
FIG. 2 shows the circuitry within an illustrative commutator-type store.

For illustrative purposes, the present invention will be discussed in terms of the preferred embodiment which utilizes a Random Access Memory unit for the variable length shift register. Referring to FIG. 1, the incoming data bits from a transmission facility (not shown) are supplied to lead 101. The varying line clock from this bit stream is recovered and supplied to lead 103. Data bits are written in or stored in commutator-type store 102 at the line clock rate. A predetermined time later, or equivalently after a predetermined amount of delay, the stored data bits are read out of store 102 and written into Random Access Memory (RAM) 104. Interconnection 105 couples the data between commutator-type store 102 and RAM 104.

The readout rate from commutator store 102 is controlled by a commutator read clock generated within control unit 106 and supplied to store 102 by lead 107. Unit 106 generates the commutator store read clock from receiver clock, $\phi$, on lead 108, twice receiver clock, $2\phi$, on lead 109, inputs 122, 123 and address counter bus inputs supplied on lead 111. The $\phi$ clock is synchronous with the transmitter clock. The $2\phi$ clock is at twice the $\phi$ frequency and has coincident positive edges relative thereto.

The cell addresses in RAM 104 into which the data bits are stored are controlled by programmable address counter 110 through bus 111. Counter 110 has a counting range or a number of states at least equal to the number of cells in RAM 104. The counter counts between an adjustable and a fixed address and then automatically resets and begins counting again. The adjustable address, stored in address preset register 112 and supplied to counter 110 via bus 113, is loaded into address counter 110 by a load-address-counter signal on lead 114. During each counter cycle, the adjustable address may be changed by an increment (INC) or decrement (DEC) signal generated within control unit 106 and supplied to register 112 through leads 115 and 116, respectively. At each count, the data bit within the cell corresponding to the particular count is read out and the data bit from commutator store 102 is written in. This read/write function is controlled by a RAM R/W signal supplied via lead 117. Counter 110 is clocked by φ pulses supplied by lead 118. The data bits appearing on output lead 119 are coupled to D-type flip-flop 120 where they are strobed with the output latch clock via lead 121. The output latch clock, generated within control unit 106, is synchronous with the receiver clock. Accordingly, the data output 127 of flip-flop 120 is synchronous with the receiver clock and can be coupled to other receiver circuitry for signal processing.

Frame slip address register 124, bus 125 and interconnections 126, 128 and 129 are used to maintain frame synchronization if RAM unit 104 overflows or underflows. In either of such events, a preselected address from frame slip address register 124 is read into address preset register 112 to adjust the range of address counter 110.

FIG. 2 shows a 4-bit commutator-type store suitable for use in the present invention. Lead 101, conducting the incoming data bits, is connected to the data (D) leads of D-type flip-flops 201, 202, 203 and 204. The line clock on lead 103 clocks 2-bit counter 205. Demultiplexer 206, driven by counter 205, serially distributes clock pulses at outputs Y1, Y2, Y3 and Y4. Leads 207, 208, 209, 210 connect these outputs respectively to the clock (CLK) input of flip-flops 201, 202, 203 and 204. Accordingly, successive data bits are serially written into flip-flops 201, 202, 203 and 204 at the line clock rate. These stored data bits are coupled by leads 216, 217, 218 and 219 to multiplexer 211 inputs I1, I2, I3, I4. The commutator store read clock, on lead 107, clocks 2-bit counter 212 which, in turn, drives multiplexer 211. Multiplexer 211 multiplexes the data bits into the original serial array at the Y output. This multiplexed output is supplied to RAM unit 104 by interconnection 105.

Write monitor lead 122, tied to lead 210, and read monitor lead 123, via leads 213, 214 and AND gate 215, connect the write and read clock pulses associated with flip-flop 204 to control unit 106.

The delay through a commutator-type store is determined by the phase relationship between the write and read clocks thereto. Such a store is capable of providing continuously variable, error-free delay of the incoming data bits so long as the read commutator clock lags behind the commutator write (line) clock. If this relationship is not maintained, the storing is said to have "spilled" and data bits will be lost.

RAM 104 configured, in a well known fashion, as a variable length shift register provides delay based on the length of the shift register. As discussed, this length is varied by adjusting the range of address counter 110 via the increment and decrement signals to address preset register 112.

A shift register alone, such as RAM 104, is not sufficiently robust to provide error free elastic storage. Since its content is read out at the fixed receiver clock rate, and time must be allowed for reading each cell location, there is only a fixed interval left per receiver clock period for writing data in. Therefore, some means must be provided for handling the arbitrary incoming data rate with respect to the fixed data output rate from RAM 104. In addition, RAM 104 can only change the delay in discrete units of time, and then, most conveniently, only once per counter cycle. The time between changes, therefore, can be as long as the longest delay through RAM 104. A continuously variable commutator-type store is needed to absorb short term and fractional delay changes. The strategy is to modify the delay through RAM 104 to prevent commutator-type store 102 from spilling while maintaining a constant overall delay from the transmitter to the output of the elastic store. This constant delay establishes synchronism between the transmitter and receiver. For purposes of illustration, this strategy as applied to the four-bit store of FIG. 2 will be discussed.

As the incoming data rate on lead 101 increases, commutator type store 102 begins to fill. When the fill exceeds one bit from half full, control unit 106 responds by causing an extra read from store 102 and a corresponding write into a new address within RAM 104. This new address is provided by a simultaneous increase in the adjustable address counter cycle via increment lead 115. The increase in the incoming data rate is thus transferred from store 102 into RAM 104, thereby returning store 102 towards half full.

The fill of store 102 is monitored just prior to reaching the fixed address limit of address counter 110. Assuming an up count address counter, a signal to begin the fill measurement of store 102 is generated within control unit 106 before address counter 110 reaches its maximum count, i.e., its fixed address limit. This signal enables a phase comparison of the read and write clocks of store 102 via write monitor lead 122 and read monitor lead 123. From this comparison, unit 106 determines the next RAM address accessed after the maximum count is reached. Specifically, the lowest address (LA) used in the last counting cycle is stored in address preset register 112. This number will either be decreased or increased, depending upon whether more or less RAM delay is required.

Figure 3:
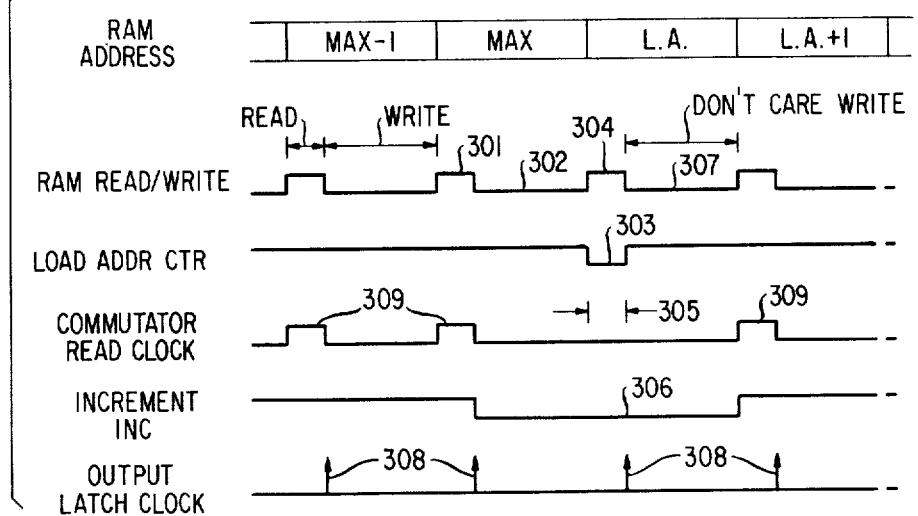
FIG. 3 shows a timing diagram of the signals provided to decrease the delay through the elastic store of FIG. 1.

FIG. 3 shows the action taken as store 102 is emptying, therefore, less delay is desired through RAM 104. After the read/write cycle, 301, 302, of the maximum address, MAX, address counter 110 is programmed to the lowest address, LA, held in address preset register 112 by load address counter signal 303. The data bit at location LA is read out by read pulse 304. Now, instead of writing the next bit into LA, the commutator store read clock is inhibited saving this bit until the next address, LA+1, is clocked in. The inhibiting of the commutator read clock is illustrated by waveform portion 305. After the inhibit operation, address preset register 112 is incremented by one by INC pulse 306 thereby setting LA+1 as the lowest address storing data. These operations shorten the RAM delay one bit, and draw the commutator store read and write clocks apart one bit period. It should be noted that the RAM write cycle 307 which addresses LA is not inhibited. The bit written into address LA will not be retrieved as it is outside of the address counter range. Pulses 308 illustrate the output latch clock pulses that strobe the RAM output from flip-flop 120.

Figure 4:
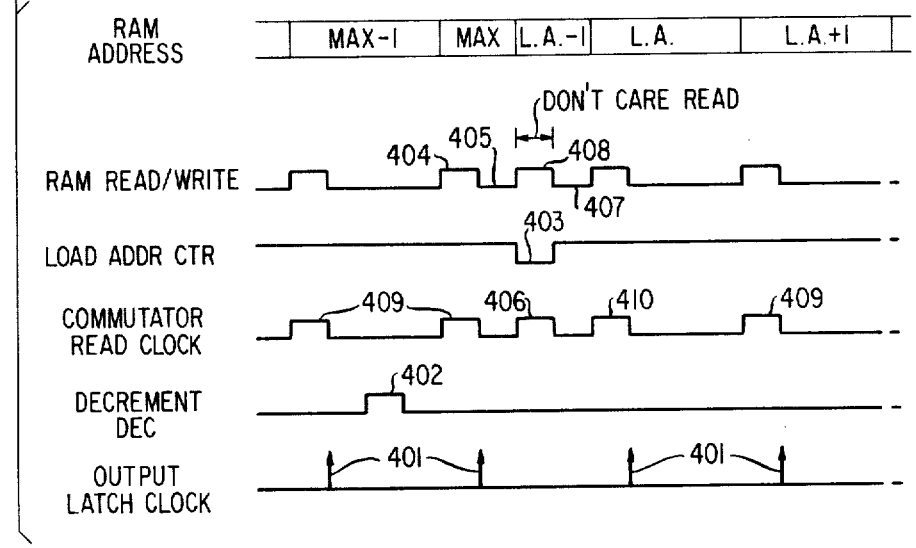
FIG. 4 shows a timing diagram of the signals provided to increase the delay through the elastic store of FIG. 1.

FIG. 4 shows the operations required when store 102 is filling and more delay is desired through RAM 104. Since the RAM output is strobed at a constant rate, as indicated by pulses 401, increasing the RAM delay requires an interstitial write-without-read operation. The lowest address (LA) stored in address preset register 112 is decreased by one by DEC pulse 402. This decremented lowest address is loaded into address counter 110 by load address counter signal 403. Consequently, counter 110 will point to the next lowest address, LA−1, from that previously written into on the last counter cycle. The maximum address, MAX, is serviced by waveform portions 404, 405 in a one-half bit period. During the remaining one-half bit period another bit is pulled from store 102 by extra commutator read clock pulse 406 and address counter 110 is programmed to address LA−1. The extra bit from store 102 is written into RAM address LA−1 by waveform portion 407. As a result, the RAM delay is increased and the commutator read and write clocks are pulled together by one bit period. It should be noted that waveform portion 408, the read of address LA−1, is designated as a "don't-care read". The bit at this location is not strobed by pulses 401 and, therefore, will not appear on output lead 127.

Figure 5:
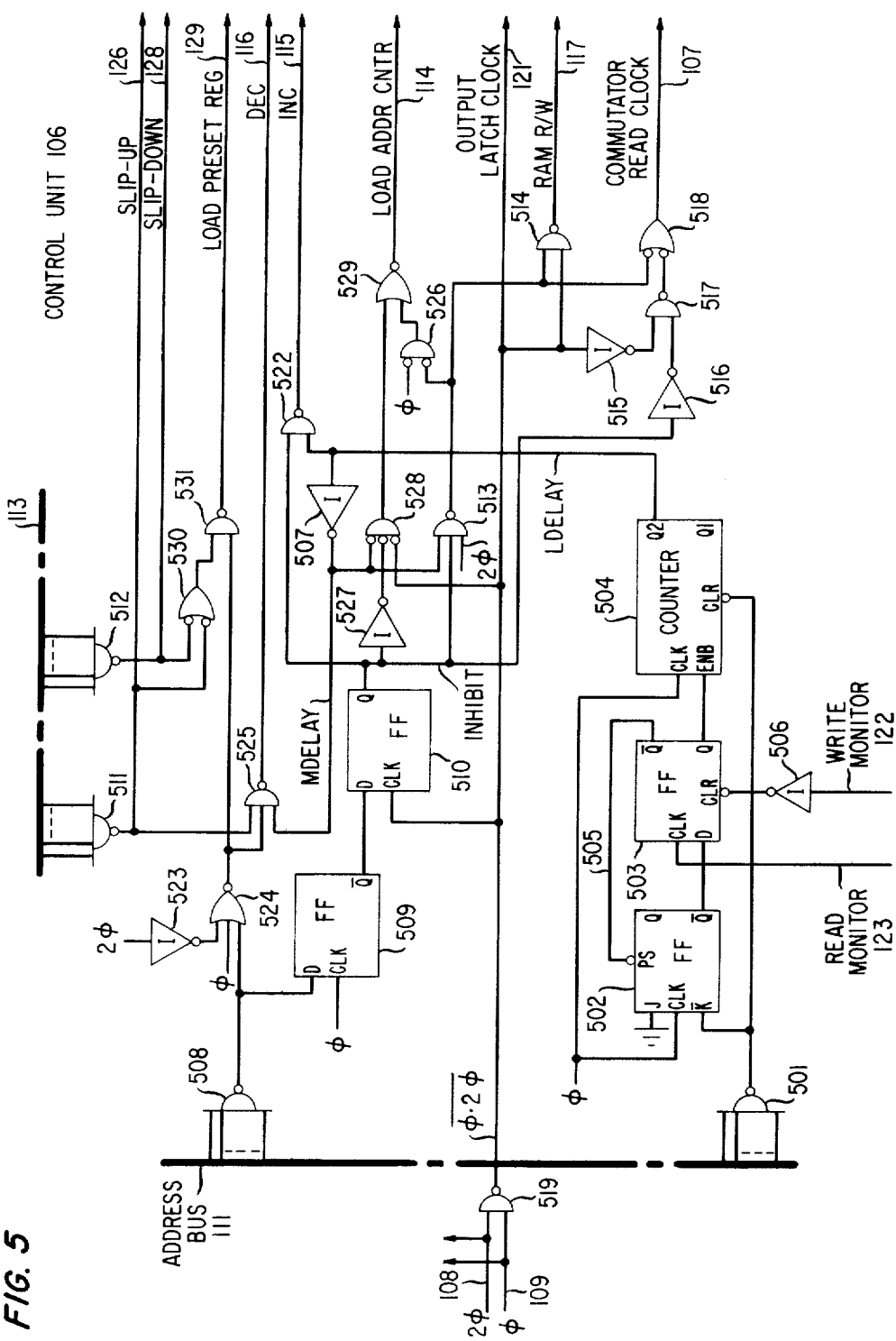
FIG. 5 is a schematic diagram of the circuitry within control unit 106 of FIG. 1.

The control signals of FIGS. 3 and 4 are generated using the circuitry set forth in FIG. 5. The heart of this circuitry resides in the measurement of the fill of commutator-type store 102. This function is provided by NAND gate 501, JK̄ flip-flop 502, D-type flip-flop 503 and 2-bit counter 504.

The fill measurement circuitry is activated by NAND gate 501. NAND gate 501, supplied with a plurality of inputs from address bus 111, provides a logical "0" output when the MAX-10 address is counted. As is obvious to those skilled in the art, the plurality of inputs on address bus 111 are selectively inverted to allow NAND gate 501 to decode the MAX-10 address. The details of these inversions, along with those associated with NAND gates 508, 511 and 512, have been eliminated for simplicity. This address gives a time window of ten receiver clock pulses to determine the fill measurement before address counter 110 resets. The "0" output of NAND gate 501 clears counter 504 and triggers flip-flop 502. Upon triggering, a logical "1" at the Q output is supplied to the D input of flip-flop 503. This "1" is coupled through flip-flop 503 to the enable (ENB) lead of counter 504 when a commutator read clock pulse appears on lead 123. A read clock pulse on lead 123 also provides a "0" on lead 505 to reset flip-flop 502. Once enabled, counter 504, clocked by the local receiver clock, $\phi$, counts $\phi$ clock pulses until a write "1" pulse appears on lead 122. The write "1" pulse is inverted by inverter 506 to clear flip-flop 503 and stop the count. Accordingly, counter 504 holds a quantized measurement of the number of bit periods between the commutator read and write clocks. A count of two or three produces an LDELAY "1" signal on most-significant-bit output Q2 of counter 504. Conversely, a count of "0" or "1" produces a "0" output on Q2 and an MDELAY "1" signal. MDELAY and LDELAY signals, as discussed infra, are used in the generation of all the signals from control unit 106.

The output of D-type flip-flop 510, designated as the INHIBIT signal, is also used in the generation of control unit 106 output signals. The INHIBIT signal is produced by NAND gate 508 and D-type flip-flops 509 and 510. NAND gate 508 generates "0" output from a plurality of address bus 111 inputs when the MAX-1 address is counted. This "0" output is coupled to flip-flop 509 which provides a $\bar{Q}=1$ output when strobed by a $\phi$ pulse. The $\bar{Q}=1$ output of flip-flop 509, in turn, produces a "1" at the Q output of the flip-flop 510 when clocked by an output latch clock, $\bar{\phi}\cdot 2\phi$, pulse from NAND gate 519. Therefore, INHIBIT equals "1" shortly after the MAX-1 address is counted and remains until a "1" at the output of NAND gate 508 is coupled through flip-flop 509 to cause a "0" at the Q output of flip-flop 510.

Commutator read clock pulses are generated on lead 107 by NAND gates 513, 517, 519, inverters 515, 516, and NOT OR gate 518. The governing equation is:

$$\text{Commutator read clock} = 2\phi\cdot\phi\cdot\overline{\text{INHIBIT}} + 2\phi\cdot\text{MDELAY}\cdot\text{INHIBIT}. \quad (1)$$

The commutator read clock pulses 409 of FIG. 4 are produced by the first term. When more delay is desired through RAM 104, MDELAY=1. After the MAX address is strobed by the RAM read/write clock, i.e., INHIBIT=1 and $\overline{\text{INHIBIT}}$=0 the first term goes to "0" and pulses 406 and 410 of FIG. 4 are produced by the second term. Alternatively, if less delay is desired through RAM unit 104, MDELAY=0 and LDELAY=1. After the MAX address is clocked, both terms equal "0" and the commutator read clock is inhibited as shown by waveform portion 305 in FIG. 3.

The RAM Read/Write waveforms of FIGS. 3 and 4 are generated by NAND gate 514 from the outputs of NAND gates 513 and 519. The governing expression is:

$$\text{RAM read/write} = 2\phi\cdot\phi + 2\phi\cdot\text{INHIBIT}\cdot\text{MDELAY}. \quad (2)$$

The first term produces one Read/Write waveform per local clock period as shown in FIGS. 3 and 4. The "don't care read"/write cycle 408, 407 of FIG. 4 is produced by the second term when MDELAY=1.

The increment, INC, signal is produced by NAND gate 522 using input signals INHIBIT and LDELAY. Inverter 523, NOR gate 524 and NAND gates 511 and 525 generate the decrement, DEC, signal. The positive edges of the INC and DEC signals, respectively, increase by one or decrease by one the number stored in address preset register 112. This number is loaded into address counter 109 by the load address counter signal (LOAD ADDR. CNTR). The timing of the load address counter signal varies depending whether more or less delay is desired through RAM 104. The governing equation is:

$$\text{LOAD ADDR. CNTR.} = \overline{(\overline{\text{INHIBIT}}\cdot 2\phi\cdot\phi\cdot\text{MDELAY} + \text{INHIBIT}\cdot\text{LDELAY}\cdot 2\phi\cdot\phi)}. \quad (3)$$

The first term, generated by NAND gate 513 and NOT AND gate 526, produces pulse 403 as shown in FIG. 4. Inverter 527 and NOT AND gate 528 generates the second term, illustrated by pulse 303 in FIG. 3, when less delay is desired through RAM unit 104. NOR gate 529 logically sums the first and second terms which are coupled to address counter 110 on lead 114.

Error free operation of the elastic store is contingent upon the RAM having sufficient capacity to adjust for variations in the fill of the commutator type store. If, however, the RAM approaches overflowing or underflowing, then a set of signals are generated to maintain frame synchronization. When RAM unit 104 is full, i.e., L.A.=0, a "0" SLIP-UP signal is generated at the output of NAND gate 511. The SLIP-UP signal is coupled to frame slip address register 124 to retrieve one of two preselected addresses stored therein. SLIP-UP retrieves an address equal to one less than the number of data bits per frame. This number is loaded into address preset register 112 as the L.A. to delay the store output by one frame, including the extra bit of delay because RAM 104 was trying to grow. Alternatively, when RAM unit 104 is empty, a "0" SLIP-DOWN signal is generated at the output of NAND gate 512. This signal retrieves an address equal to MAX minus eleven less the number of data bits per frame. The reason for the number 11 is that the "empty" state decoded by gate 512 is actually MAX−11, which prevents the RAM store size from shrinking to less than the measurement window. Notice that this slip-down address, MAX minus 11 less the number of bits per frame, does not account for the fact that the store was trying to shrink. That is because the load-preset-register signal occurs before the INC signal. The INC signal will make the final number stored in the address preset register 112 to be MAX minus 10 less the number of bits per frame. This second address, which is also supplied to address preset register 112, causes a full frame of data bits to be dropped. The addresses from frame slip address register 124 are loaded into address preset register 112 by the load preset register signal on lead 129. This signal is generated by NAND gates 508, 511, 512, 531, Inverter 523, NOR gate 524 and NOT OR gate 530.

In the above-described control circuitry, the RAM delay is adjusted when the fill of commutator-type store 102 varies by one bit from half full. It will be obvious to those skilled in the art that a larger capacity commutator-type store could be used to adjust the RAM delay after the commutator store fill varies by an integer number of bits.

As used herein, the terms "data bits" and "data" should be understood to include PCM encoded signals such as voice, video, facsimile and so on, as well as the data output of a typical data machine.

I claim:

1. An elastic store for receiving data bits at a variable line rate comprising
   a first buffer store (102) having a number of storage cells (201, 202, 203, 204),
   first means (205, 206) for writing in said data bits into said storage cells at said variable line rate, and
   a second buffer store (104) having a number of addressable storage cells,
   means for addressing (110) the storage cells in said second buffer,
   characterized by
   secod means (513, 514, 515, 516, 517, 518, 519) for reading out said data bits from said first buffer store and writing in said bits into addressed cells in said second buffer store at a given rate, the read-out cycle of said first buffer normally occurring subsequent to the write-in cycle of said first buffer,
   third means (513, 514, 519, 120) for reading out said data from said second buffer store at a predetermined rate,
   control means (112) for rendering variable the number of storage cells in said second buffer that are addressed, and
   first buffer monitor means (501, 502, 503, 504, 506) for examining the phase between the read-out and write-in cycles of said first buffer and producing control signals when the phase drifts by a preselected amount, said control signals causing said given rate to increase or decrease depending upon the relative direction of said drift, said control signals further directing said control means to respectively increase or decrease the number of storage cells in said second buffer that are addressed.

2. The elastic store of claim 1 wherein the variations in said given rate in response to said control signals drives said first buffer toward half-fill.

3. The elastic store of claim 1 wherein said preselected amount corresponds to a fill of said first buffer store being a number of bits more than half said number of storage cells of said first buffer store.

4. The elastic store of claim 1 wherein said preselected amount corresponds to a fill of said first buffer store being a number of bits less than half said number of storage cells of said first buffer store.

5. The elastic store of claims 3 or 4 wherein said number of bits is one.

6. The elastic store of claim 5 wherein said second buffer store is a random access memory unit.

* * * * *